(12) United States Patent
Danko et al.

(10) Patent No.: US 7,065,994 B1
(45) Date of Patent: Jun. 27, 2006

(54) MAGNETIC MARKER FOR MANUFACTURING PROCESSES AND IDENTIFICATION OF FINISHED WORKPIECES

(76) Inventors: Donald M. Danko, 3513 Scanwood Dr., Richfield, OH (US) 44286; Joseph H. Taddeo, 3446 Timberwood Trail, Richfield, OH (US) 44286

( * ) Notice: Subject to any disclaimer, the term of this patent is extended or adjusted under 35 U.S.C. 154(b) by 332 days.

(21) Appl. No.: 10/376,125

(22) Filed: Mar. 1, 2003

Related U.S. Application Data

(63) Continuation-in-part of application No. 09/696,618, filed on Oct. 25, 2000, now Pat. No. 6,526,793.

(51) Int. Cl.
G01N 3/00 (2006.01)
G01R 33/12 (2006.01)
G01B 7/04 (2006.01)

(52) U.S. Cl. .............. 72/17.1; 72/31.01; 72/213; 72/389.1; 83/209; 83/370; 33/206; 33/751; 324/206; 324/214

(58) Field of Classification Search ........... 72/389.1, 72/17.1, 31.01, 213; 361/143, 144; 324/208, 324/214; 73/760; 83/209, 370; 33/206, 33/751
See application file for complete search history.

(56) References Cited

U.S. PATENT DOCUMENTS

| | | | | |
|---|---|---|---|---|
| 4,446,711 A | * | 5/1984 | Valente | |
| 4,471,304 A | * | 9/1984 | Wolf | 324/208 |
| 4,572,293 A | * | 2/1986 | Wilson et al. | |
| 4,654,912 A | * | 4/1987 | Gray | |
| 4,835,805 A | * | 6/1989 | Gray | |
| 4,888,993 A | * | 12/1989 | Yamaoka et al. | 73/760 |
| 6,527,193 B1 | | 3/2003 | Beli | 235/493 |

* cited by examiner

*Primary Examiner*—David Jones
(74) *Attorney, Agent, or Firm*—Joseph H. Taddeo

(57) ABSTRACT

A permanent invisible magnetic marking and positioning system of unfinished steel rods, spring steel bars, workpieces, and the like. A midpoint or center of the rod, bar or workpiece is automatically located and a high-energy pulse is applied for an embedded magnetic marker in the workpiece. Meanwhile, the magnetizing heads can also be repositioned to various points on a workpiece for imparting manufacturing and product identification data. In the case of leaf springs, the center of a spring steel bar is located a magnetic marker is embedded there. A high-energy rectangular pulse imparts a permanent invisible magnetic marks and data. The embedded indicators having peak magnetic strength allow manual or automatic positioning for perfect alignment in bending, tapping and other forming processes.

29 Claims, 12 Drawing Sheets

MAGNETIC MARKER FOR MANUFACTURING PROCESSES AND IDENTIFICATION OF FINISHED WORKPIECES

Applicants claim the benefit of domestic application which is a continuation-in-part of Ser. No. 09/696,618, filed Oct. 25, 2000, U.S. Pat. No. 6,526,793, issued Mar. 4, 2003.

FIELD OF THE INVENTION

The present invention relates primarily to a permanent magnetic marking and positioning system of unfinished metal bars, workpieces and the like, and more particularly, to a magnetic marking and positioning system, which permits central alignment of a cylindrical steel rod, a flat bar or other workpiece to its longitudinal center or other designated point prior to a bending, tapping or another manufactured formation.

BACKGROUND OF THE INVENTION

In the manufacture of U-bolts, springs and other related parts, it is common to cut a long steel rod or bar into shorter sections of predetermined length. For U-bolts, each rod section remains straight and each is threaded along the opposite end portions. To produce a U-bolt, each of the threaded straight rods are then successively inserted into a hydraulic or powered bending and forming machine that cold forms each rod around a U-shaped mandrel.

Before performing the bending operation, an operator must place the unbent rod in the bending machine and position it using a tape measure to position it so that the midpoint of the rod is aligned with the center of the mandrel.

Meanwhile, for the manufacture of leaf springs, a center bolt holds all the leaves together and the head of the bolt locates the spring on the axle. Positioning of center bolt hole at a midpoint of the flat bar is required. With the steel red hot, the eyes are formed by pulling the steel around a mandle. The prior scarfing operation allows for round eyes.

When rods of different lengths are being successively formed into U-bolts, it is necessary to readjust the adjustable stops for each rod that is different in length. This requires additional setup time for each group of rods being formed. Still more time is wasted in determining the longitudinal center of the rod, and then positioning it over the center of the mandrel. This manual process is also subject to human operator error due to fatigue.

Visual marking and forming machines used for the production of U-bolts is well known in the prior art. Disclosed are several forming machines that use a variety of longitudinal center marking methods. Examples of such prior art are shown in the patents that follow.

U.S. Pat. No. 4,835,805, granted Jun. 6, 1989, to J. C. Gray, discloses the production of threaded metal rods for making U-bolts, where straight cylindrical metal rods are threaded along opposite ends and the center portion is marked to form a visual indicator of the longitudinal center of the rod. The mark identifying the center of each rod extends circumferentially around the metal rod and is formed by a stripe of color contrasting ink directly to the rod provide a permanent mark that does not require rotating the rod to find the mark. The mid-point mark on each rod is aligned with the center plane mark on the machine and the rod is bent to form a precision U-bolt.

U.S. Pat. No. 4,654,912, granted Apr. 7, 1987, to J. C. Gray, discloses the production of threaded metal rods for making U-bolts, where straight cylindrical metal rods are threaded along opposite ends and the center portion is marked to form a visual indicator of the longitudinal center of the rod. The mark identifying the center of each rod extends circumferentially around the metal rod and is formed by a stripe of color contrasting ink to provide a permanent mark that does not require rotating the rod to find the mark. The mid-point mark on each rod is aligned with the center plane mark on the machine and the rod is bent to form a precision U-bolt.

U.S. Pat. No. 4,572,293, granted Feb. 25, 1986, to J. G. Wilson, et al., discloses a method for placing magnetic markers on collarless cased wellbores. A magnetic marker is used to locate wireline tools in wellbores using collarless housing. The magnetic marker is applied at selected positions on the casing before or after placing casing in a well.

U.S. Pat. No. 4,446,711, issued to Raymond L. Valente on May 8, 1984, discloses and claims a novel improvement for a U-bolt bender.

Still another prior art patent, U.S. Pat. No. 4,572,293, issued to Wilson, et al., on Feb. 25, 1986, discloses the use of magnetic depth markers placed at regular vertical intervals for depth of wireline tools during a logging run.

The prior art recited above does not teach of the novel advantages that are found in the present invention. Several teach of using visual stripes using tapes or labels to mark the center of the rod being formed.

Accordingly, it is therefore an object of the present invention to provide a novel positioning means to locate the longitudinal center of a cylindrical steel rod prior to being cut to a desired predetermined length.

It is another object of the present invention to provide a novel magnetic marking means at the longitudinal center of a cylindrical steel rod prior to being cut to a desired predetermined length.

It is still another object of the present invention to provide a novel positioning and longitudinal centering means for a magnetically marked cylindrical steel rod so that it can be formed into a precise U-bolt, having equal and symmetrical ends.

Yet another object of the present invention is to provide a novel method of marking a cylindrical steel rod, using a permanent non-visual marker, to provide a coded identification of the manufacturer in the event of a catastrophic failure of the entire assembly, such as in an aircraft failure.

A final object of the present invention is magnetically imprinting each bar for a leaf spring, at the midpoint or other location of a hole to be pierced.

These as well as other objects and advantages of the present invention will be better understood and appreciated upon reading the following detailed description of the preferred embodiment when taken in conjunction with the accompanying drawings.

SUMMARY OF THE INVENTION

The present invention relates primarily to a novel permanent magnetic marking and positioning system of unfinished metal bars, which aligns a cylindrical ferrous rod to its longitudinal center point (or balance point) prior to forming in a bending and forming machine.

In one aspect of the present invention, the ferrous rod that is used to manufacture the U-bolts is magnetically marked at its center-point and then cut to the desired length by longitudinally inserting the raw cylindrical rod into a cutoff saw station or machine until it comes in contact with a stop that is set to the desired predetermined length. The frame includes at least one magnetizing head each including an electromagnetic coil. An automatic centering device positions each magnetizing head located at the longitudinal center, on each side, of the rod. While positioned at a midpoint of a secured rod a high energy current pulse is provided across the coil to the rod, thereby magnetically marking the midpoint of the rod with a permanent invisible magnetic mark indicator of a longitudinal center of the rod.

he system is automated, for when the raw cylindrical rod comes in contact with the stop, it closes a switch which results in sending a high energy current pulse to an electromagnetic coil mounted on each magnetizing head, thereby magnetically marking the midpoint of the steel rod prior to being cut to the desired predetermined length. Typically, the pulse is rectangular, having an amplitude in the range of 5 to 150 volts, preferably 24 volts and a duration in the range 10 to 500 milliseconds, preferably at least 100 milliseconds.

After each magnetically marked rod is suitably cut to the desired predetermined length, each of the opposite ends is threaded to the desired thread size.

In another aspect of the present invention, the unbent threaded steel rod is positioned in the hydraulic or powered bending machine, so that the longitudinal center of the rod is aligned to the center of the bending mandrel. A peak magnetic detector is used to locate the magnetic center of the rod. The peak detector gives a visible presentation on a meter, in either digital or in analog form, or even gives an audible 'beep' at the located midpoint. A centering indicator having peak magnetic strength detection allows manual or automatic positioning of the rod so that the center of the magnetic mark is perfectly aligned with the center of the bending mandrel. Once the midpoint of the rod is positioned and aligned with the center of the mandrel, the straight threaded rod is formed into a U-bolt.

The magnetic mark remains permanently embedded at the crest of the formed U-bolt, thereby rendering a permanent tag identifying the origin of the U-bolt.

As such, the invention comprises a system for locating and marking a midpoint of unfinished rod stock placed on a support frame, table, workbench or cutoff station, with a means for securing a rod in a fixed position, a means for locating a longitudinal center of the rod before being cut to length and, a means for embedding in the rod a permanent invisible indicator of the longitudinal center of the rod. The frame includes a repositioning end stop for receiving rods of varying lengths, the end stop having an associated microswitch actuated by contact with a rod inserted on the frame and communicating with a grip, for closure of grip to automatically secure the rod in the desired position for marking a midpoint of a specified rod length.

When in use, the invention provides a method of efficiently producing heavy duty U-bolts of different sizes, wherein each U-bolt has two legs of substantially equal length. The method includes the steps of providing a supply of straight metal rods with opposite ends, smooth cylindrical outer surfaces, different predetermined lengths, and transverse center planes defining a longitudinal center of each rod substantially equidistant from the ends of each rod. Helical threads are formed on opposite end portions of each rod, which are successively fed into a marking machine having an at least one relative movable magnetizing head with means for embedding an invisible magnetic mark center indicator to the rods. The rods are successively marked by imparting a current pulse from an electromagnetic coil at substantially the transverse center plane of each rod to produce a permanent invisible magnetic mark center indicator at the longitudinal center of each rod, whereupon the rods are successively transferred from the marking machine and inserted into a forming machine with a mandrel for bending.

The rods are supported between two mandrel bending members which are relatively movable with respect to each other, the mandrel having a magnetic detector, a mandrel center mark, and a surface for supporting the rod between its ends during bending. Each rod is positioned with the embedded magnetic mark center indicator in alignment with the mandrel center mark by use of the magnetic detector, succeeded by moving the mandrel and the bending members with respect to each other to bend each rod around the mandrel surface. The bending members engage the rod in an area spaced longitudinally from the permanent invisible magnetic mark center indicator of each rod. In this manner, a U-bolt having two legs of substantially equal length is produced from each rod for providing a supply of U-bolts differing in leg length size from each other with minimum scrap resulting from differing leg lengths in a single U-bolt.

In an alternative embodiment, the magnetic mark is made using two magnetizing heads on either side of the cylindrical rod, where the first head imparts a magnetic north imprint and the second head, a magnetic south imprint. By using a double magnetic imprint, a discriminator circuit is used to locate the magnetic center, which with correct calibration, coincides with the midpoint of the rod.

As such, the objects of the invention are achieved by providing a system for locating and marking a point on an unfinished workpiece, including a means for securing a workpiece in a fixed position, a means for locating a desired bending, tapping or other marking point for a manufacturing process on the workpiece and, a means for embedding in the workpiece a permanent invisible indicator at the desired marking point of the workpiece. The permanent invisible indicator is a magnetic mark imparted by one or more magnetizing heads having an electromagnetic coil and positioned at the desired marking point of the workpiece. The magnetic mark is embedded at the desired marking point by applying a current pulse across said coil.

The magnetizing head moves in a path parallel to the longitudinal axis of the workpiece. Meanwhile, the desired magnetic marker may also be imparted by a pair of magnetizing heads each located on an opposite side of the workpiece, mounted on identical positioning means and fixed to identical armatures, such that each magnetizing head is directed to the desired marking point of the workpiece for magnetically marking the workpiece at said point. Also, two adjacent magnetizing heads of opposite polarity fixed on a positioning armature on a same side of the workpiece, which impart a first magnetic imprint and a second magnetic imprint of opposite polarity to the workpiece. The magnetizing heads can also be repositioned to many points on a workpiece for imparting manufacturing and product identification data.

BRIEF DESCRIPTION OF THE DRAWINGS

The present invention is pictorially illustrated in the accompanying drawings that are attached herein.

DETAILED DESCRIPTION OF THE PREFERRED EMBODIMENT

Figure 1:
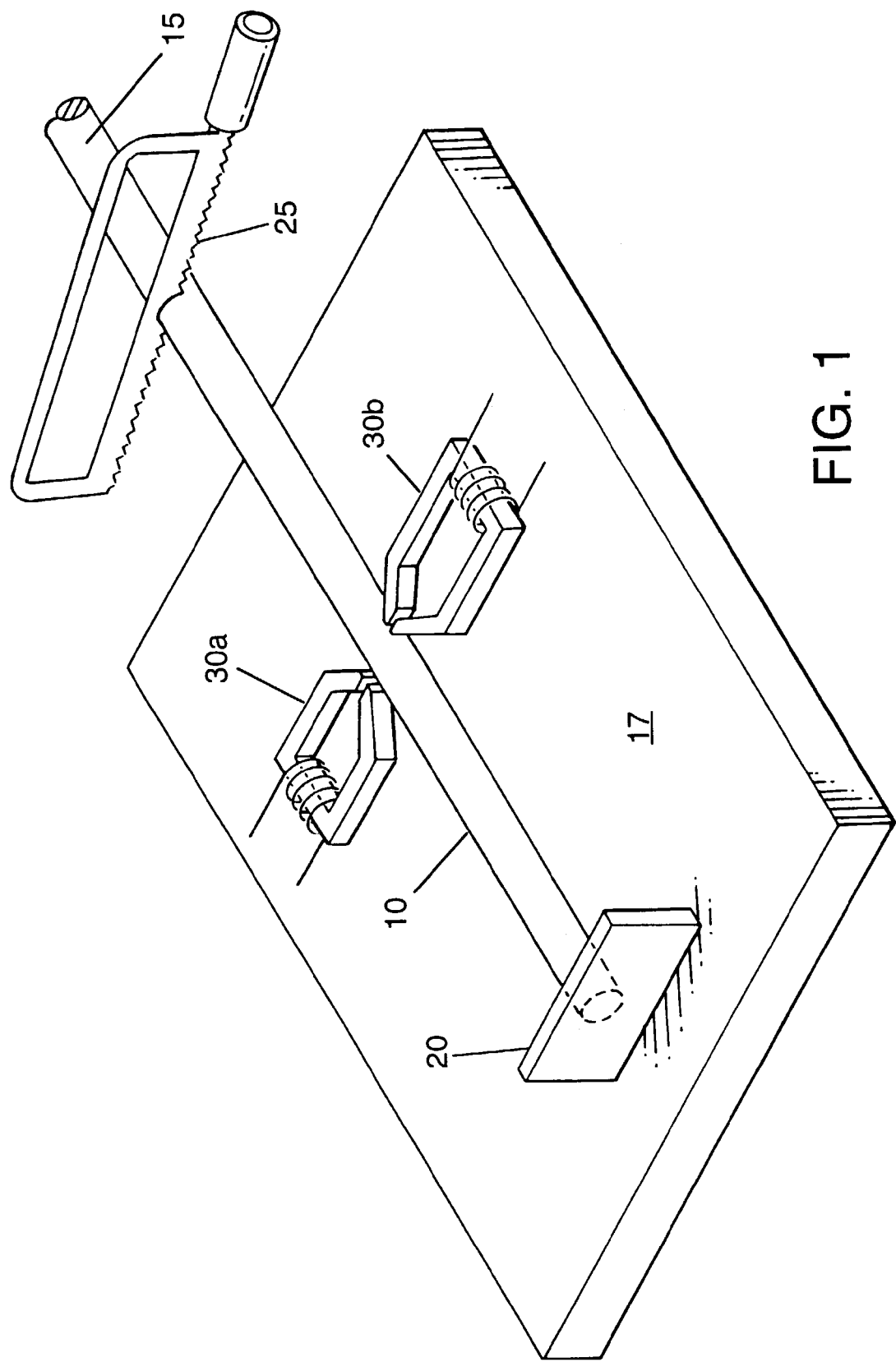
FIG. 1 is a perspective view of a straight cylindrical steel rod, positioned at the stop, where the magnetizing heads are positioned at the midpoint of the rod, prior to being cut to the desired specified length.

Referring to FIG. 1, the cylindrical metal rod 10 is shown being cut to the desired length, from the metal rod stock 15. The rod stock 15, stabilized on a table, workbench or support frame 17, is inserted longitudinally into the cutoff station until it reaches the end stop 20. Two magnetizing heads 30a and 30b, each bearing a coil 30, are placed on either side of the inserted cylindrical rod stock 15 at its midpoint, where it is magnetically marked by passing a momentary pulse of DC current through the coil of the magnetizing heads. Upon completion of magnetically marking the longitudinal center of the metal rod, it is cut to the desired length using cutoff saw 25.

The straight metal rod 10 is commonly manufactured in a wide range of diameters that range from ¼ inch to 1¼ inches. Depending upon the application, the material composition that is used for the U-bolts can be of a mild steel.

Figure 2:
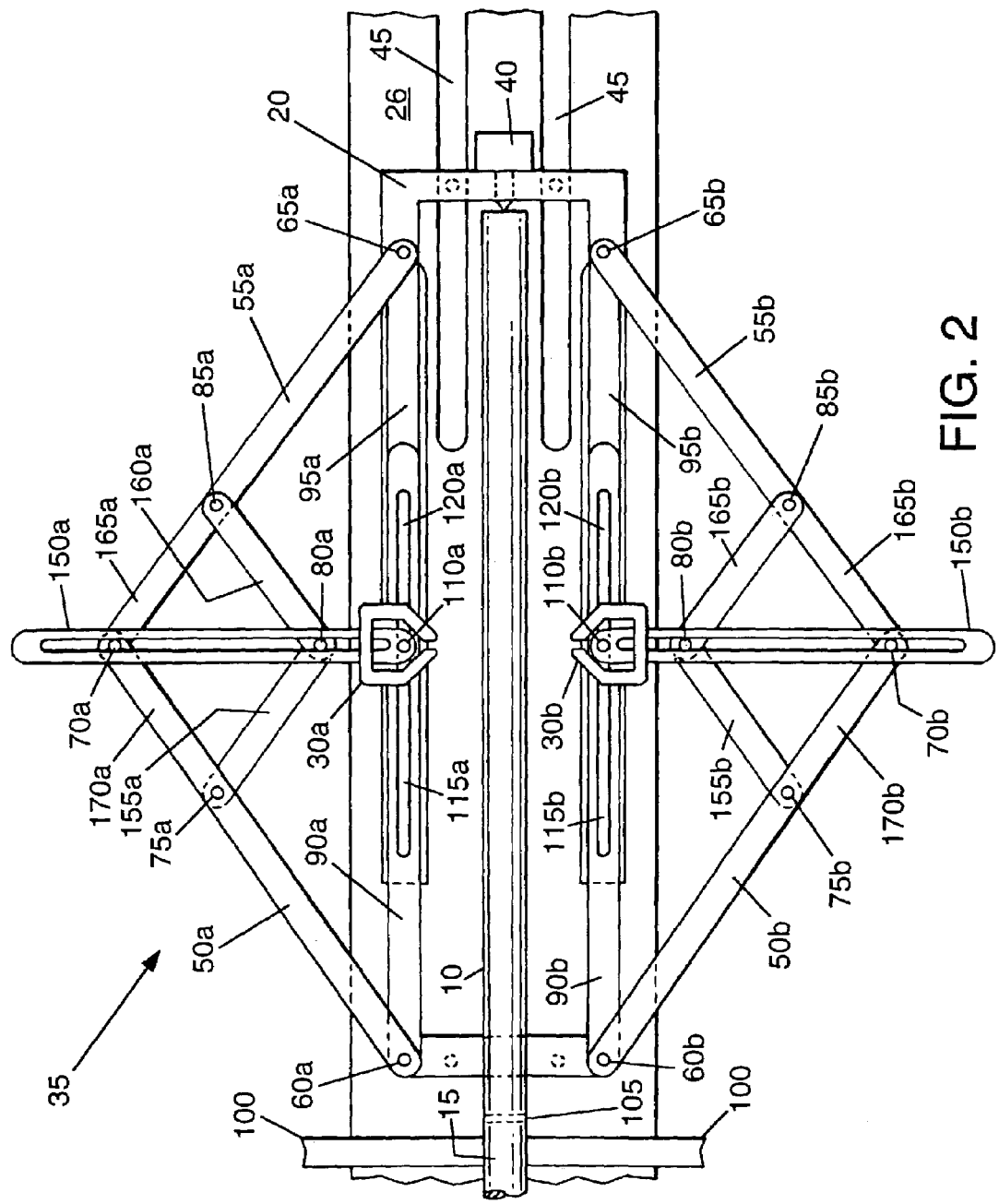
FIG. 2 is a plan view of the novel dual midpoint locating device as applied to the cutoff station.

To provide an automated means of finding the midpoint of the cylindrical rod portion 10, before it is cut to length, a novel dual head positioning linkage 35 mounted upon the cutoff station base 26 is shown in FIG. 2.

The end stop 20 is positioned in the cutoff station by sliding it along the track openings 45, then securing it when the desired position is reached. The metal rod stock 15 is inserted into the cutoff station until it comes in contact with end stop 20, where it actuates microswitch 40. Upon the closure of microswitch 40, the grip or rod-clamps 100 grip the uncut cylindrical rod stock 15 maintaining it securely in position. With the uncut rod 15 being held securely in position, a short high energy current pulse energizes the magnetizing heads 30a and 30b to invisibly mark the midpoint of the rod before it is cut to its final length. The rod is then cut to length along the section designated as 105.

As illustrated, the upper portion of the head positioning and centering linkage apparatus is comprised of equal arms 50a and 55a, and telescoping arms 90a and 95a, which form an equilateral triangle. Bisecting center arm 150a subdivides the angle formed by arms 50a and 55a, by virtue of the fact, that arm 155a is parallel to arm section 165a, and arm 160a being parallel to arm section 170a, thereby forming a parallelogram while maintaining arm 150a precisely directed toward the midpoint of the rod being cut off. The head 30a, being firmly attached to arm 150a, moves in a path that is parallel to rod 15, by virtue of the follower guide pin 110a traversing through the slotted channels 115a and 120a found in telescoping arms 90a and 95a, which form the base of the triangle. By maintaining the accuracy of the arms, with respect to the distances between pivots 60a, 65a, 70a, 75a, 80a and 85a, the center arm bisects an angle between the equal arms 50a and 55a and bisects the telescoping base 90a–95a. The magnetizing heads 30a and 30b will always be positioned at the midpoint of the rod being prepared for use, independent of the change in tooling setup for different U-bolts, having varying lengths and diameters. Additionally, to preserve the setup accuracy, it is necessary that the horizontal distance between the saw cut 105 and the pivot 60a be equal to the horizontal distance between the inner surface of end stop 20 and the pivot 65a.

The lower portion of the head positioning and centering apparatus is an identical mirror image of the left side portion where all numerical designators are suffixed with the letter 'b'.

Figure 3:
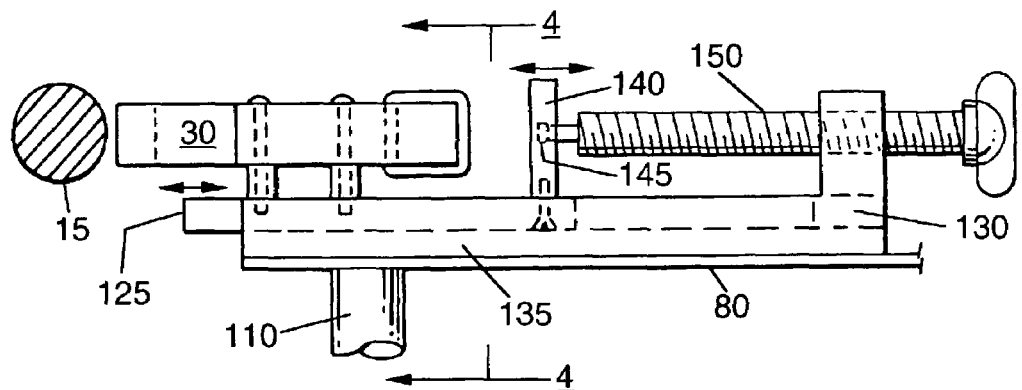
FIG. 3 is an exploded side view of the magnetizing head inward positioning arrangement.
Figure 4:
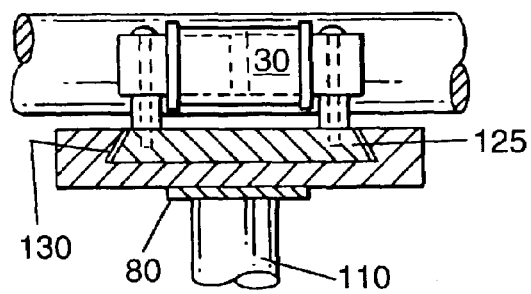
FIG. 4 is a sectional view of the magnetizing head inward positioning arrangement.

Turning now to FIGS. 3 and 4, there is shown in detail, the head extension apparatus. The coil 30 of a magnetizing head 30a,30b is mounted to the slide carriage 125, having a truncated triangular cross-section that traverses its mating receiving channel 130 in slide base 135. The entire slide apparatus is mounted orthogonal to the rod 15. Also attached to the slide carriage 125 is an adjustor receptacle 140 that captivates the ball end 145 of the head adjustment screw shaft 150. The base 135 is rigidly mounted on top of the armature or arm 80, and the follower guide pin 110 is attached below to the bottom of the armature or arm 80.

Figure 3A:
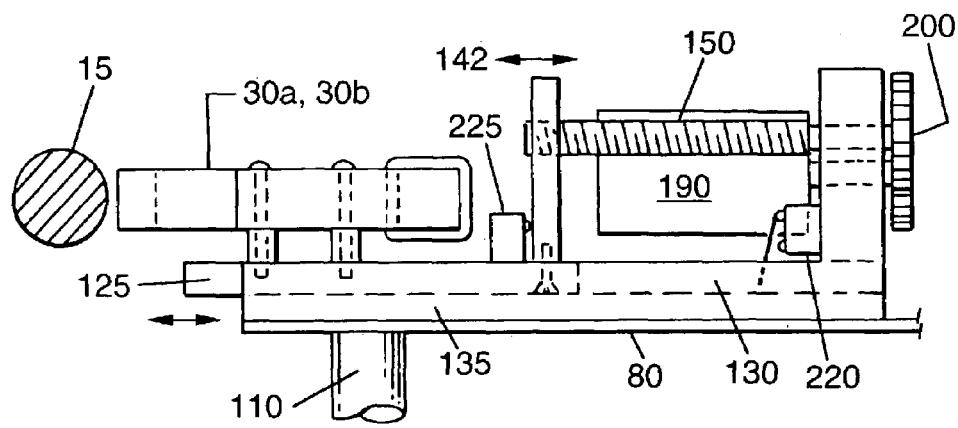
FIG. 3A is a side elevation of the magnetizing head inward positioning arrangement having a motorized drive to position the pulse marking magnetizing head.
Figure 3B:
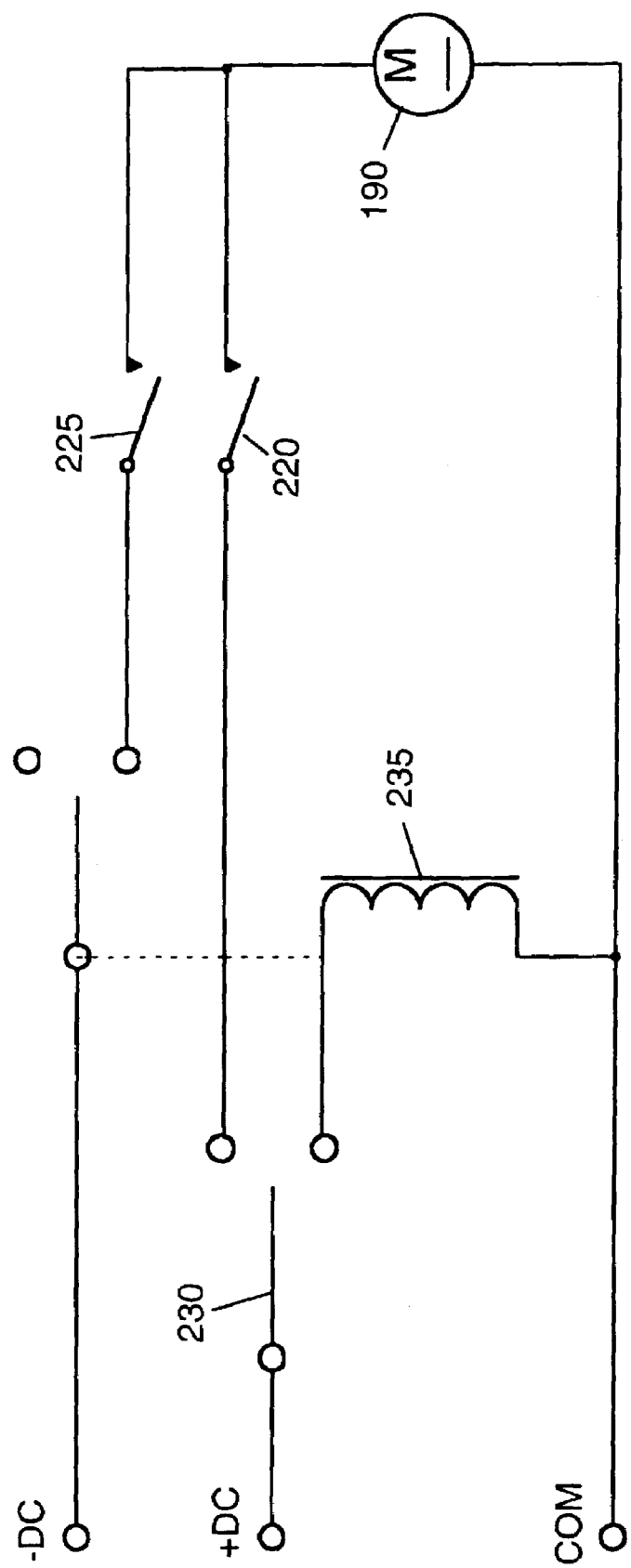
FIG. 3B is a schematic drawing showing the detailed electrical connections to the DC motor for the motor reversal sequences to position and retract the magnetizing heads.

In a first alternative embodiment, as shown in FIGS. 3A and 3B, the orthogonal head positioning assembly may be motorized to enable the heads to be retracted when the uncut rod is inserted into the cutoff station. When the rod reaches the end stop, the microswitch 230 is actuated and the heads 30a and 30b are restored to their operating positions.

In typical operation, with no rod in the cutoff station, the magnetizing heads 30a and 30b are in their fully retracted outward position. When an uncut rod 15 is inserted into the cutoff station, the rod is positioned forward toward the stop 20 until it depresses the rod position-sensing switch 230.

Upon actuation of switch 230, the relay 235 becomes energized, causing its relay contacts to close, which results in the reversible motor, preferably a DC motor 190 to rotate in a clockwise direction. Mounted to the shaft of the DC motor 190 is a pinion assembly 200, with a small pinion (not shown) engaged with the larger pinion 200 to cause the screw shaft 150 to rotate in a counterclockwise direction. The screw shaft 150, being screwed into the threaded head adjustor receptacle 142, causes the magnetic heads 30a and 30b to move inwardly, via carriage 125, toward the uncut rod 15. When the head adjustor receptacle 142 comes in contact with forward adjustable travel limit switch 225, it actuates the switch causes the motor 190 to stop its rotation. The switch 225 is suitably mounted so that it can be adjusted for the varying diameters of rods during the setup procedure.

After the magnetizing pulse is imparted into the metal rod 15, the rod is cut to the desired length 10 in the saw cut region 105. Upon completion of the saw cut, the cut rod 10 drops releasing its contact with rod sensing switch 230, causing the motor 190 to start rotating in the reverse direction. Concurrently, the rod clamp jaws 100 are subsequently disengaged releasing the clamped rod 15. The motor 190 continues rotating in the same direction until it contacts travel limit switch 220, which opens the switch contacts, resulting in the motor to stop its rotation. The magnetizing heads 30a and 30b now have been moved into their fully retracted position, allowing the uncut rod to be inserted without causing damage to the heads, which completes the cycle for this operation.

Figure 5:
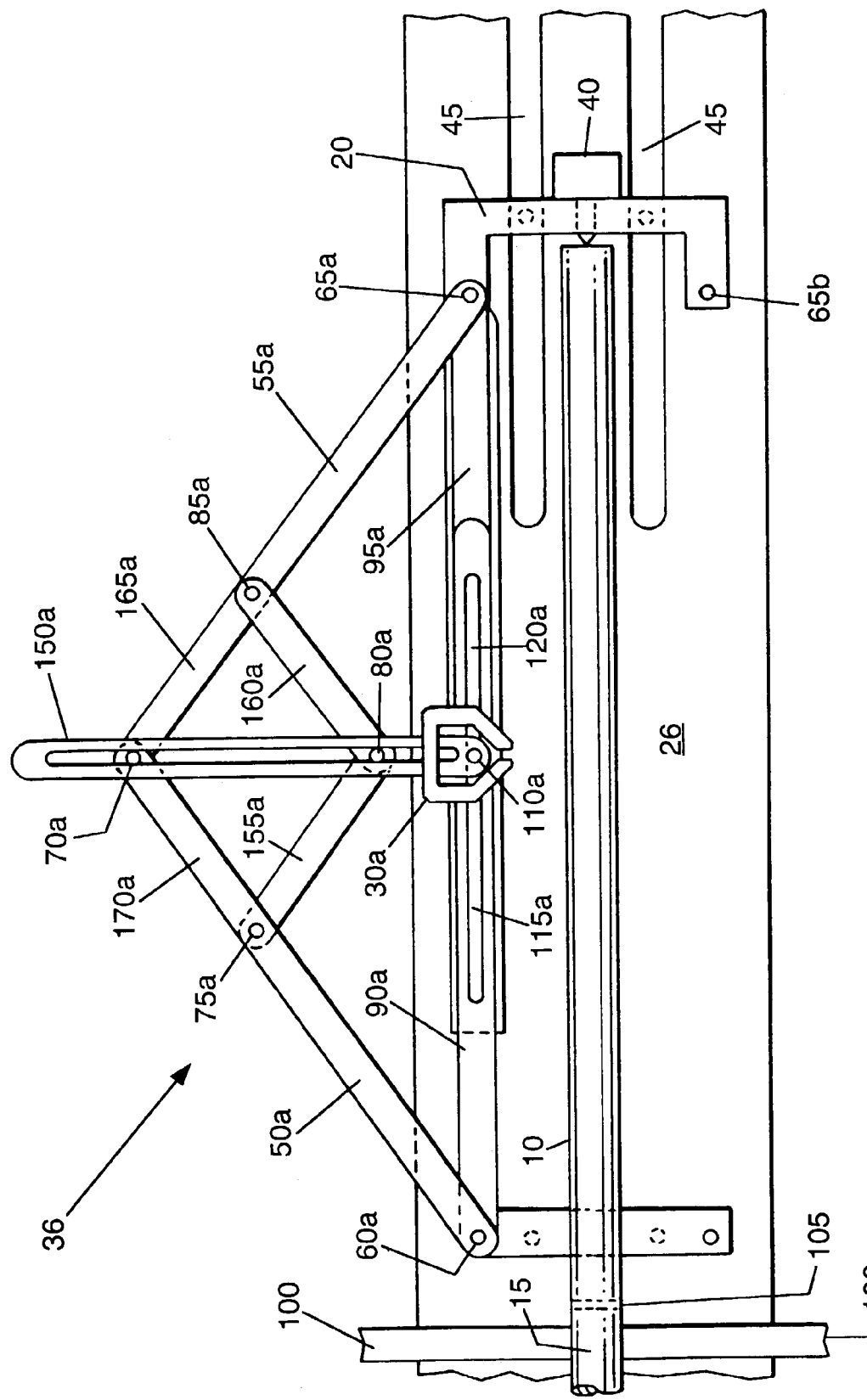
FIG. 5 is a plan view of an alternative embodiment showing a single magnetizing head positioned at the midpoint of the rod as applied to the cutoff station.

In a second alternative embodiment, FIG. 5 illustrates a single magnetizing head centering and positioning mechanism that may be used when the rod diameters are of reduced size. The single head positioning and centering apparatus 36 is identical to the upper linkages as shown in FIG. 2, where all of the numerical designators are suffixed with the letter 'a'.

Figure 6:
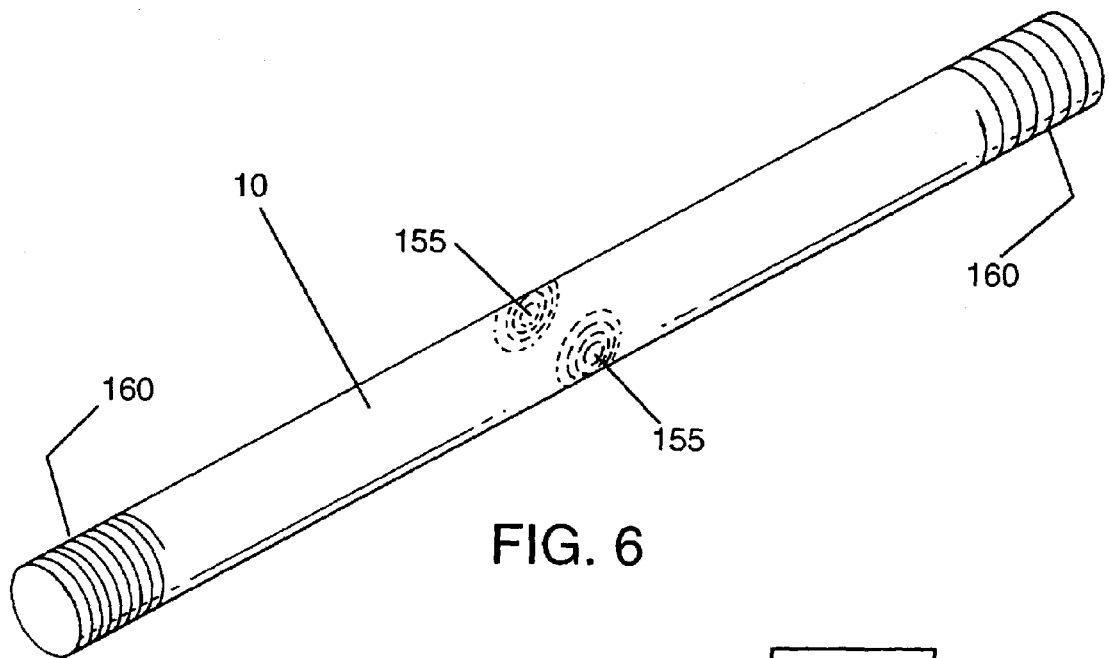
FIG. 6 is a perspective view of a straight metal rod having opposite threaded end portions and a center portion with a permanent magnetized mark indicating the midpoint of the rod as located and embedded pursuant to the present invention.

FIG. 6 illustrates the cylindrical steel rod 10 after being first receiving the invisible magnetic mark 155, subsequently cut to the desired length, and then in an ensuing operation, having both ends receiving threaded portions 160.

Figure 7A:
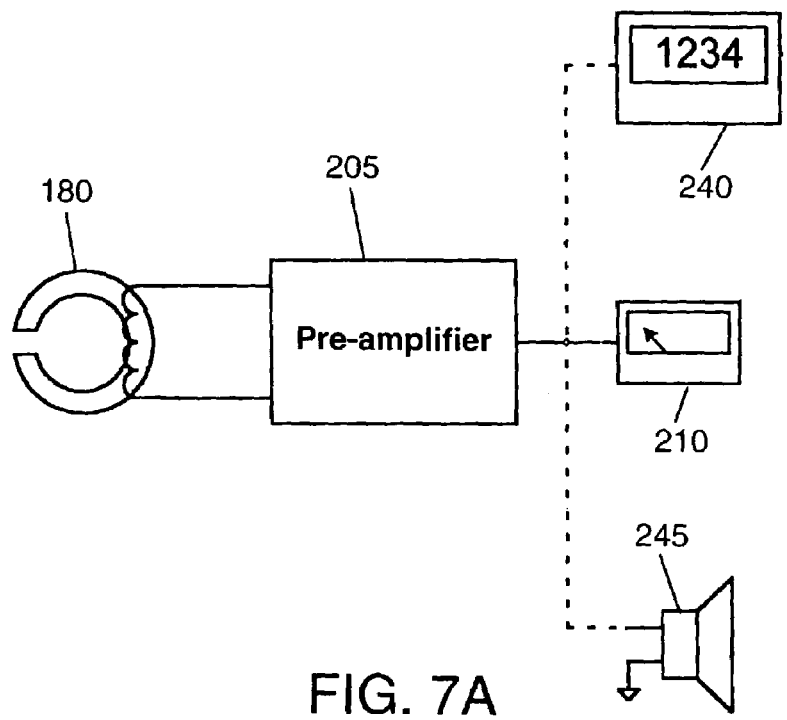
FIG. 7A is a block diagram that illustrates the magnetic mark pickup head, connected to a preamplifier, whose output is an analog meter that shows the meter deflection being proportional to the intensity of the magnetic mark.
Figure 7:
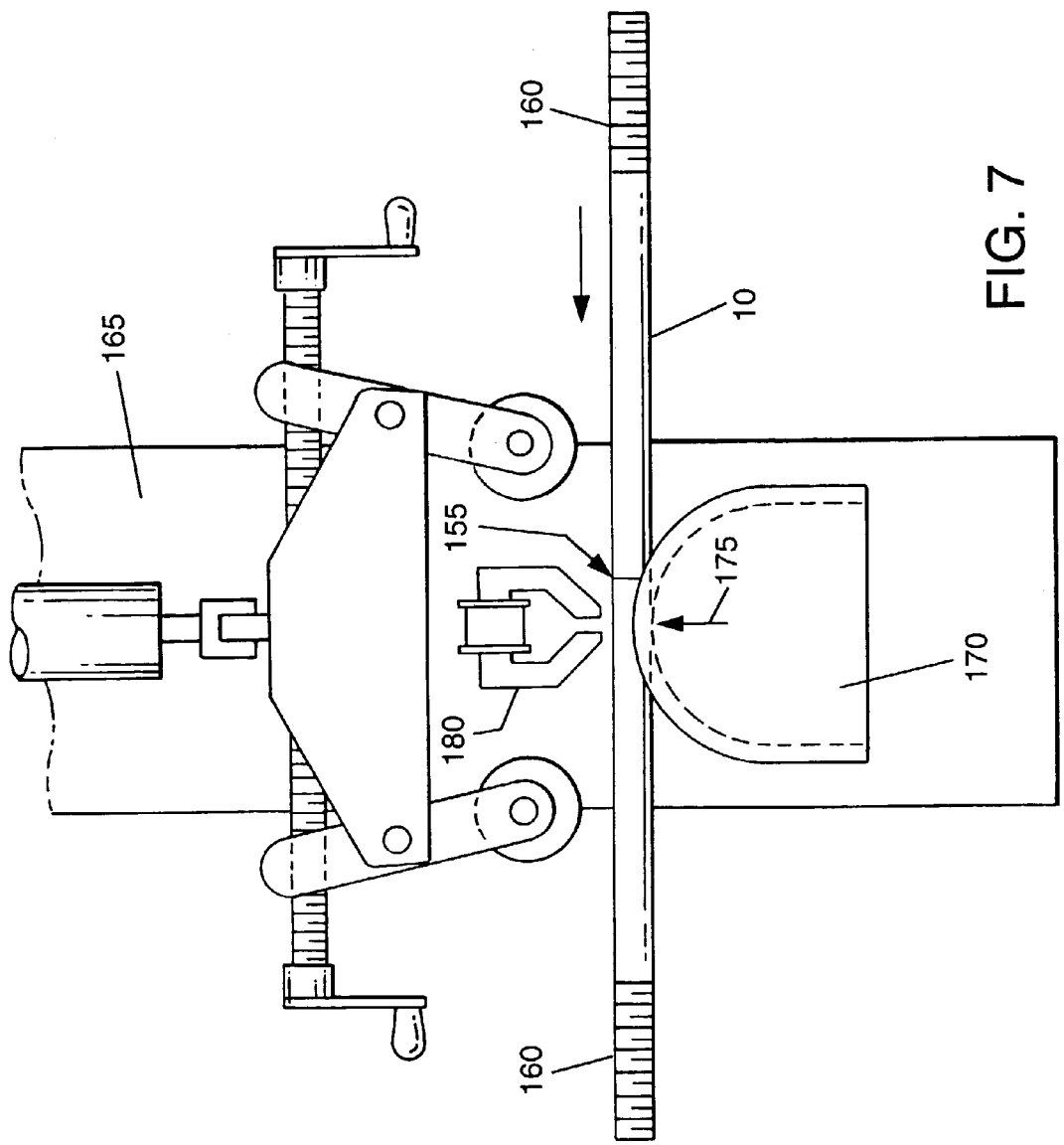
FIG. 7 is a side elevational view of one form of a manual rod bending-machine used to form a U-bolt having a magnetic sensing head to determine the location of the magnetic mark.

FIG. 7 illustrates a manual U-bolt bending machine 165 adapted to receive a magnetic mark pickup head 180 to detect the magnitude of the recorded magnetic midpoint mark. The output of the pickup head 180 is amplified, then displayed on a meter connected to the amplifier output. As the rod 10 is moved to the left, as shown, the meter deflects to a maximum indicating a maximum peak that coincides with the midpoint of the rod 10. When the magnetic mark coincides with the center alignment mark of the mandrel 175, the bending of the rod 10 to form a U-bolt may commence.

There is shown in FIG. 7A, a block diagram that illustrates the magnetic mark pickup head 180, connected to preamplifier 205, whose output is an analog meter 210 that shows the meter deflection being proportional to the intensity of the magnetic mark. It may be advantageous to provide alternatively a digital numeric readout 240 to give the operator a more precise readout of the imprinted magnetic mark. In still another embodiment, a speaker 245 connects to the amplifier output to provide an audible output that is proportional to the magnetic intensity, thereby enabling the operator to manually position the rod without having to observe a panel meter readout.

Figure 8:
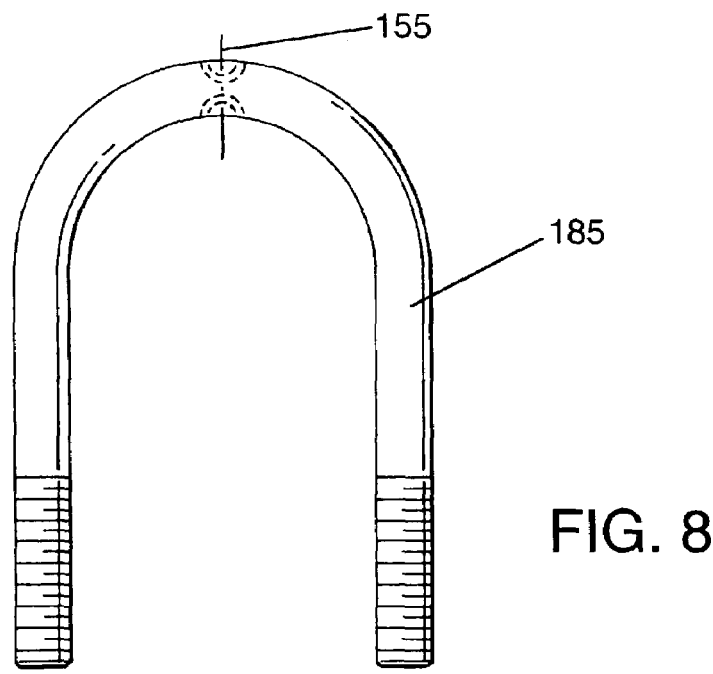
FIG. 8 is a side elevational view of a U-bolt formed from a rod as illustrated in FIG. 1.

FIG. 8 shows a finished manufactured U-bolt 185, after being formed in the U-bolt bending machine, having the invisible magnetic mark 155.

Figure 9A:
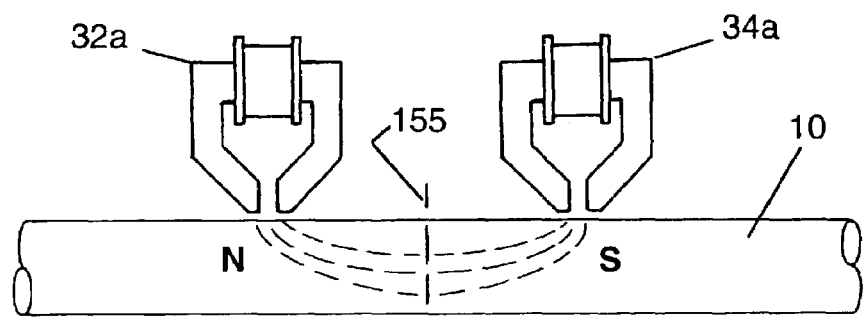
FIG. 9A is an exploded view of the magnetic mark imparted by two magnetizing heads, each of opposite polarity, on the same side of the cylindrical rod.
Figure 9B:
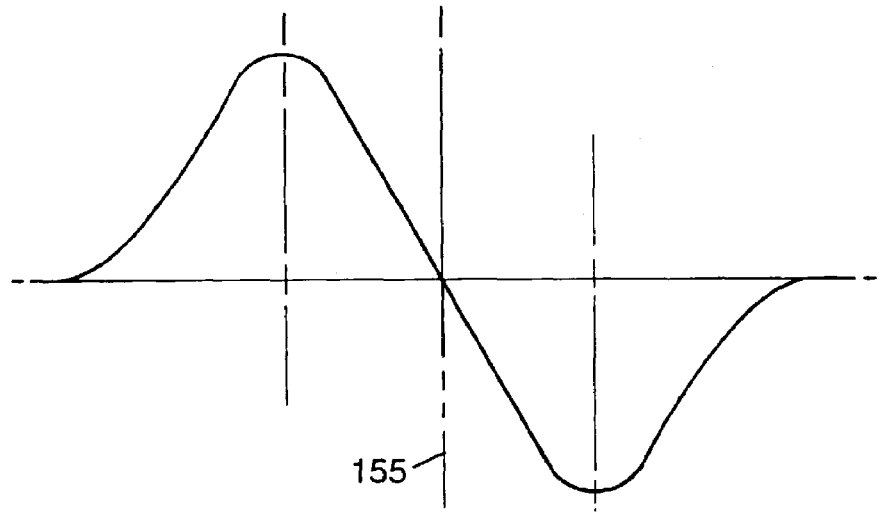
FIG. 9B details the corresponding electrical discriminator output with reference to the magnetically marked cylindrical rod as shown in FIG. 9A.

FIGS. 9A and 9B illustrate another embodiment, where the magnetic mark is made by having two magnetizing heads 32a and 34a, of opposite polarity, placed next to each other on the same side of the cylindrical rod. The first head 32a imparts a magnetic north imprint and the second head 34a, a magnetic south imprint. With a double magnetic imprint, with each having a comparable magnetic strength, a discriminator circuit is used to locate the magnetic center, (a zero crossing as displayed on a galvanometer), which with correct calibration, coincides with the midpoint of the rod. The midpoint is precisely where the output of the discriminator output crosses zero.

Figure 10:
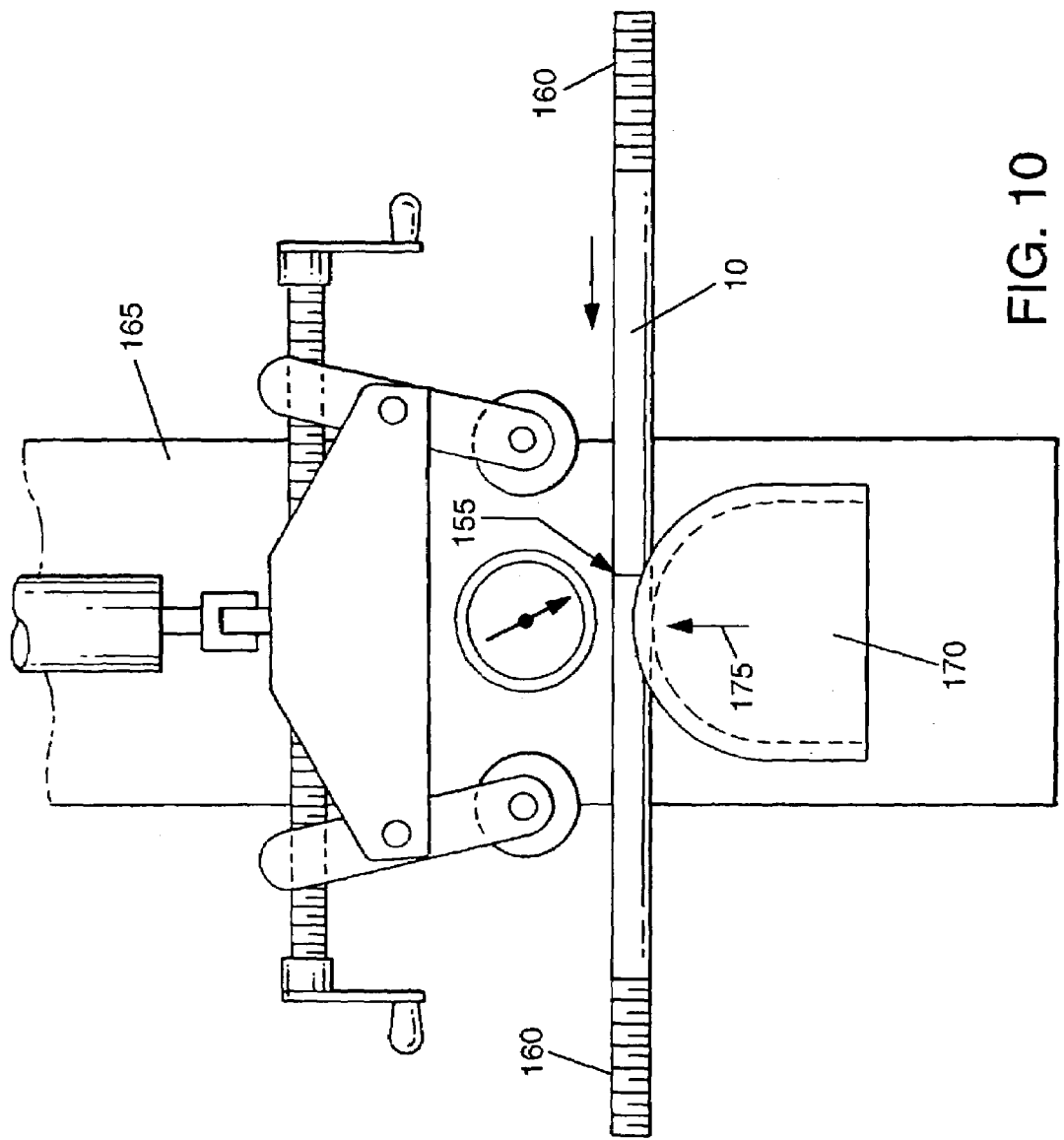
FIG. 10 is a side elevational view of an alternative embodiment having one form of a manual rod bending-machine used to form a U-bolt using a compass-like visual indicator to determine the location of the magnetic mark.

FIG. 10 illustrates still another embodiment where a simple magnetic indicator locates and displays the magnetic center mark imparted to the steel rod. The magnetic indicator is similar to that of a direction finding compass where the indicator points toward the midpoint of the invisible permanent magnetic mark instead of pointing to the earth's magnetic north.

Figure 11:
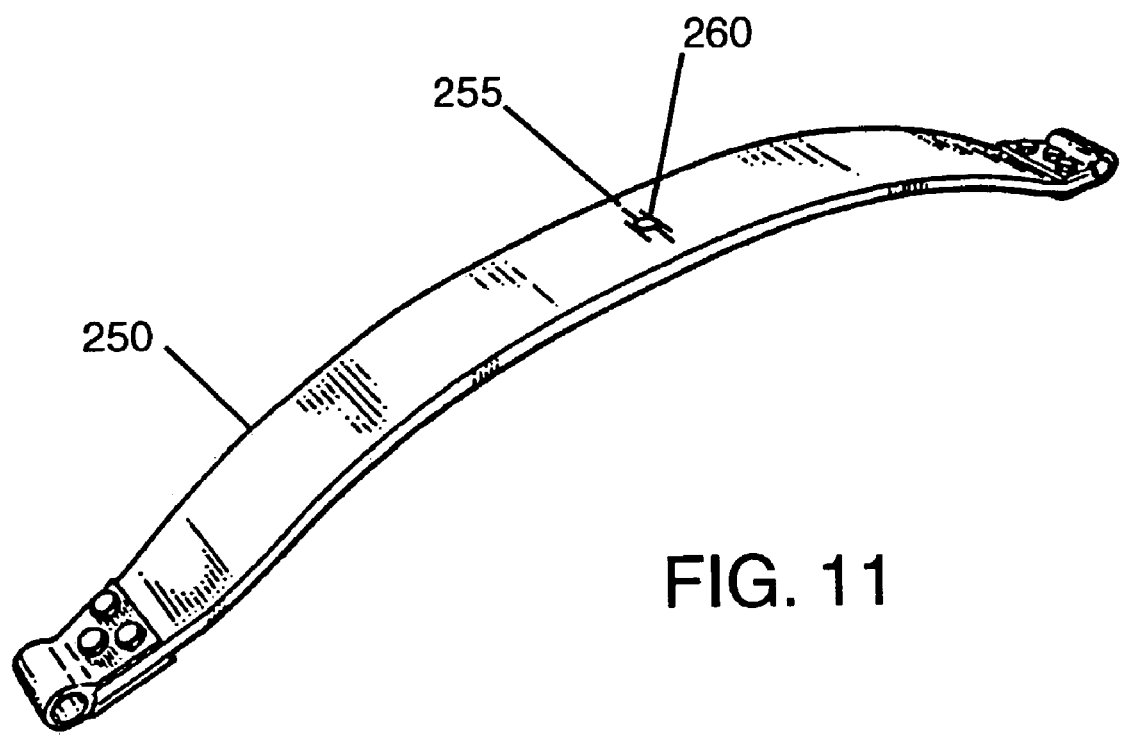
FIG. 11 is a perspective view of a single leaf of a single leafed, leaf spring, having a centrally located hole.
Figure 12:
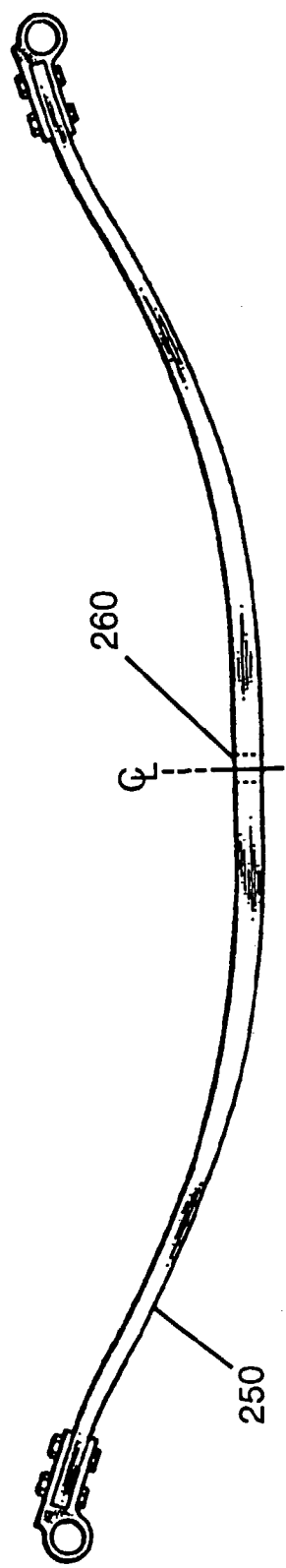
FIG. 12 is a side elevational view of a single leafed, leaf spring, having a centrally located hole.
Figure 13:
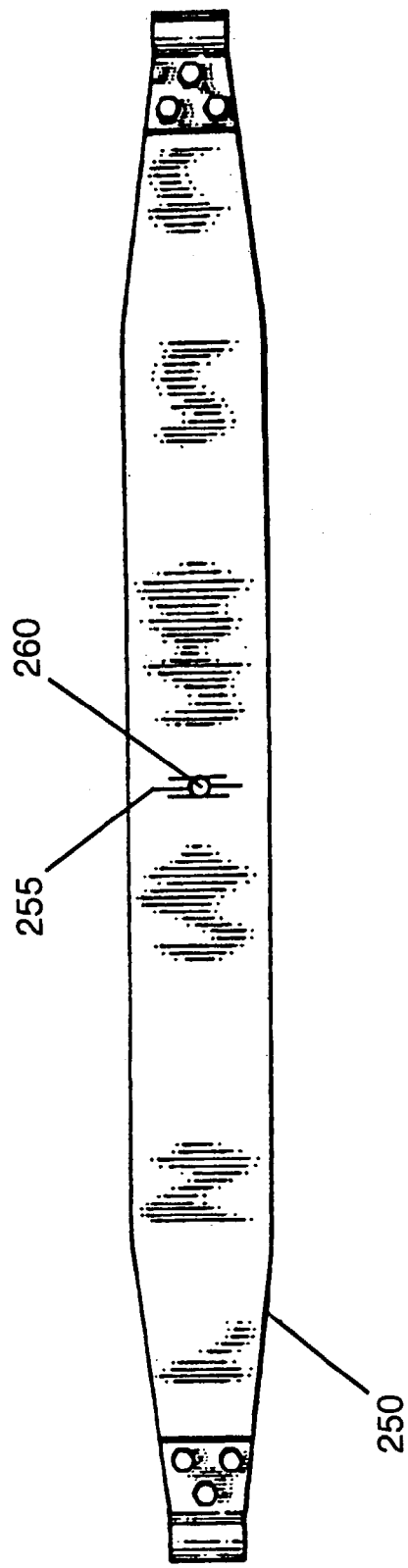
FIG. 13 is a top elevational view of a single leafed, leaf spring, having a centrally located hole.

Turning now to FIGS. 11, 12, and 13, there is shown a typical example of a single leafed, leaf spring 250 of the type to be manufactured, where the centrally located hole 260 is to be punched.

In the manufacture of leaf springs, the proper sized steel is selected from the many available stock sizes. Upon the proper selection of the steel stock, it is sheared to the desired length shown on the blue print.

After the raw bar is sheared to it may be transferred to another workstation where it may be positioned to located the center of the workpiece, and subsequently magnetically marked to indicate the exact position where the hole is to be pierced. Because the magnetic mark 255 is invisible to the naked eye, the mark is shown diagrammatically as three parallel lines, where the line in the middle between two shorter lines, is shown as the longer line, which demarks the center line of the hole to be punched.

Upon completion of the marking process, the workpiece is transferred to the area where the presses are found. Each press is instrumented with the magnetic sensing heads and positioning system. A 60-ton press is typically used to pierce each leaf to provide the hole for a center bolt.

Figure 14:
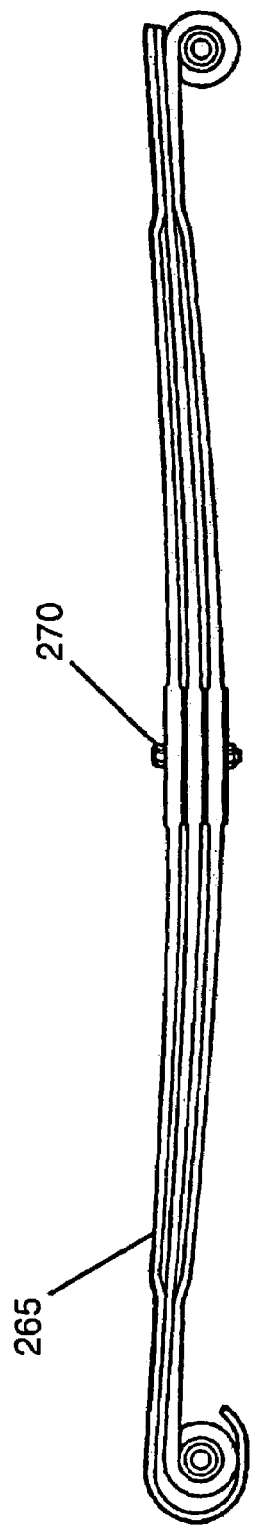
FIG. 14 is a side elevational view of a multiple leafed, leaf spring assembly, having centrally located holes in each leaf.
Figure 15:
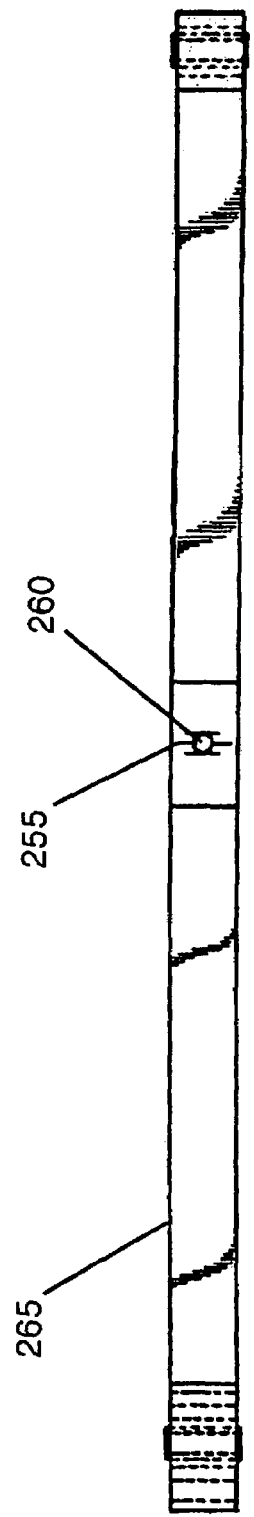
FIG. 15 is a top elevational view of a multiple leafed, leaf spring assembly, having centrally located holes in each leaf.

Shown in FIGS. 14 and 15, is an assembly of multiply leaved, leaf springs 265, where each leaf has the location of the hole to be pierced, magnetically imprinted. Each leaf is then individually pieced in the punch press with a hole, found precisely at the central location as marked magnetically. Center hole 260 is used to align the multiple leaves together, where in the final assembly, a center bolt and nut 270 holds all the leaves together.

It should be understood that there may be numerous modifications, advances or changes that can be made to the present invention, but in doing so, it is intended that they should not detract from the true spirit of the present invention.

We claim:

1. A system for locating and marking a point on an unfinished workpiece, comprising:
   a means for securing a workpiece in a fixed position;
   a means for locating a desired bending, tapping or other marking point for a manufacturing process on the workpiece;
   a means for embedding in the workpiece a permanent invisible indicator at the desired marking point of the workpiece; and
   wherein the invisible indicator embedded at the desired marking point of the workpiece comprises a magnetic mark including a coded identification tag, that identifies a manufacturer, a manufacture location, a manufacture date, a product identification and the like.

2. The system of claim 1, wherein an at least one magnetizing head having an electromagnetic coil is positioned at the desired marking point of the workpiece; and the magnetic mark is embedded at the desired marking point by a current pulse across said coil.

3. The system of claim 2, wherein the at least one magnetizing head moves in a path parallel to a longitudinal axis of the workpiece.

4. The system of claim 3, wherein the at least one magnetizing head comprises a pair of magnetizing heads each located on an opposite side of the workpiece, mounted on identical positioning means and fixed to identical armatures, such that each magnetizing head is directed to the desired marking point of the workpiece for magnetically marking the workpiece at said point.

5. The system of claim 3, the at least one magnetizing head comprising two adjacent magnetizing heads of opposite polarity fixed on a positioning armature on a same side of the workpiece, which impart a first magnetic imprint and a second magnetic imprint of opposite polarity to the workpiece.

6. The system of claim 2, further comprising a means for detecting the workpiece magnetic mark indicator for further formation of the workpiece in a manufacturing process.

7. The system of claim 6, the means for detecting comprising a peak magnetic detector.

8. The system of claim 6, wherein the workpiece magnetic mark is located using a simple magnetic indicator for positioning the workpiece for bending, tapping or other manufacturing process.

9. The system of claim 8, wherein the current pulse comprises a rectangular pulse.

10. The system of claim 9, wherein said rectangular pulse has an amplitude in a range from about 5 volts to about 150 volts.

11. The system of claim 10, wherein the workpiece comprises a U-bolt.

12. The system as recited in claim 11, wherein the invisible magnetic mark is a center indicator embedded at a crest of the U-bolt.

13. The system as recited in claim 10, wherein the workpiece comprises an unfinished leaf steel bar, wherein a center of the bar is magnetically marked to indicate an exact position where a center hole for a center bolt is to be punched.

14. The system as recited in claim 13, wherein each spring steel bar of a leaf spring has a magnetically marked midpoint with a center hole punched at said midpoint.

15. The system as recited in claim 14, wherein a center bolt through the center of each bar of the leaf spring holds all leaves of the spring together.

16. A magnetic marking and positioning system for use in marking workpieces, comprising:
a means for locating a center of a workpiece;
an automatated circuit connected to a means for securing the workpiece and a means for sending an electromagnetic pulse to the workpiece, said means for sending positioned at the workpiece center via the means for locating; and, means for opening the circuit concurrent with locating said workpiece center, whereby a permanent magnetic mark is embedded at said center; and
wherein the magnetic mark embedded in the workpiece at each of the plurality of points divergent from the workpiece center includes data sufficient to identify the manufacturer, plant location, date of manufacture, machine operators, a product number, product identification and the like.

17. The magnetic marking and positioning system as recited in claim 16, wherein the means for sending an electromagnetic pulse is successively repositioned to a plurality of points divergent from the workpiece center.

18. The magnetic marking and positioning system as recited in claim 17, wherein a magnetic marker is embedded in the workpiece at each of the plurality of points divergent from the workpiece center.

19. A system for marking a workpiece, comprising:
a means for securing a workpiece in a fixed position;
a means for embedding in the workpiece in said fixed position a permanent invisible indicator comprising a magnetic mark including a coded tag; and
wherein the coded tag provides a workpiece identification including a manufacturer, a manufacture location, a manufacture date, a product identification and the like.

20. The system for marking a workpiece defined in claim 19, further comprising a magnetic mark pickup means having an output.

21. The system for marking a workpiece in accordance with claim 20, wherein the pickup means detects a magnitude of the embedded magnetic mark.

22. The system for marking a workpiece in accordance with claim 21, wherein the pickup means is connected to an amplifier whose output is an analog meter that shows the meter deflection being proportional to the intensity of the magnetic mark.

23. The system for marking a workpiece in accordance with claim 21, wherein the pickup means output comprises a digital numeric readout for a more precise readout of the imprinted magnetic mark.

24. The system for marking a workpiece in accordance with claim 22, wherein a speaker connects to the amplifier output to provide an audible output that is proportional to the magnetic intensity, thereby enabling the operator to manually position the workpiece without having to observe a readout.

25. A magnetic marking and positioning system for marking workpieces, comprising:
a means for locating a desired marking point on a workpiece;
a pair of magnetizing heads each having an electromagnetic coil and mounted on identical positioning means and fixed to identical armatures, such that each magnetizing head is directed to the desired marking point for magnetically marking the workpiece;
an automatated circuit connected to the identical positioning means and a means for sending an electromagnetic pulse to the workpiece, said means for sending positioned at the desired marking point of the workpiece via the means for locating;
a means for opening the circuit concurrent with locating said desired marking point, wherein a coded magnetic mark is embedded at said point by a current across the coil;
said coded magnetic mark including data sufficient to identify the manufacturer, plant location, date of manufacture, machine operator, a product number, product identification and the like.

26. The magnetic marking and positioning system as recited in claim 25, wherein the means for sending an electromagnetic pulse is repositioned to a plurality of points, and wherein the coded magnetic mark is successively embedded in the workpiece at each of the plurality of points on the workpiece.

27. The magnetic marking and positioning system as recited in claim 26, wherein the coded magnetic mark embedded in the workpiece at each of the plurality of points includes data sufficient to identify the manufacturer, plant location, date of manufacture, machine operators, a product number, a product identification and the like.

28. The magnetic marking and positioning system of claim 27, wherein each magnetizing head of said pair is located on an opposite side of the workpiece.

29. The system of claim 27, wherein each magnetizing head of said pair is of an opposite polarity and positioned on a same side of the workpiece, which impart a first magnetic imprint and a second magnetic imprint of opposite polarity to the workpiece.

* * * * *